United States Patent
Acker et al.

(10) Patent No.: US 6,349,964 B1
(45) Date of Patent: Feb. 26, 2002

(54) GAS BAG SIDE IMPACT PROTECTION DEVICE

(75) Inventors: Dominique Acker, Alfdorf; Jürgen Hirth, Gschwend; Stein Helge Mundal, Mutlangen; Hendrik Oheim, Berlin, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/458,903

(22) Filed: Dec. 10, 1999

(30) Foreign Application Priority Data

Dec. 11, 1998 (DE) ..................... 298 22 159 U

(51) Int. Cl.$^7$ ............................................. B60R 21/22
(52) U.S. Cl. ................ 280/730.2; 280/730.1; 280/736; 280/742
(58) Field of Search ................ 280/730.1, 730.2, 280/728.2, 736, 742

(56) References Cited

U.S. PATENT DOCUMENTS

| | | | | |
|---|---|---|---|---|
| 5,018,762 A | * | 5/1991 | Suzuki et al. ............... | 280/731 |
| 5,310,214 A | * | 5/1994 | Cuevas ....................... | 280/729 |
| 5,366,242 A | * | 11/1994 | Faigle et al. ................ | 280/736 |
| 5,520,413 A | * | 5/1996 | Mossi et al. ................. | 280/729 |
| 5,524,924 A | * | 6/1996 | Steffens, Jr. et al. ...... | 280/730.2 |
| 5,556,128 A | * | 9/1996 | Sinnhuber et al. ........ | 280/730.2 |
| 5,573,271 A | * | 11/1996 | Headley ...................... | 280/741 |
| 5,718,450 A | * | 2/1998 | Hurford et al. ........... | 280/730.2 |
| 5,791,685 A | * | 8/1998 | Lachat et al. ............. | 280/743.1 |
| 5,803,485 A | * | 9/1998 | Acker et al. .............. | 280/728.2 |
| 5,806,881 A | * | 9/1998 | Richter et al. ........... | 280/730.2 |
| 5,853,191 A | * | 12/1998 | Lachat ...................... | 280/730.2 |
| 5,895,070 A | * | 4/1999 | Lachat ...................... | 280/730.2 |
| 5,913,536 A | * | 6/1999 | Brown ...................... | 280/730.2 |
| 5,944,344 A | * | 8/1999 | Yoshioka et al. ........... | 280/740 |
| 5,984,348 A | * | 11/1999 | Specht et al. ............. | 280/730.2 |
| 6,050,601 A | * | 4/2000 | Pantke et al. ................ | 280/742 |
| 6,059,311 A | * | 5/2000 | Wipasuramonton et al. ..... | 280/729 |
| 6,065,773 A | * | 5/2000 | Klinger et al. ............... | 280/736 |
| 6,073,959 A | * | 6/2000 | Heinz et al. ................. | 280/729 |
| 6,089,598 A | * | 7/2000 | Snyder et al. ............... | 280/740 |
| 6,158,769 A | * | 12/2000 | Swann et al. ................ | 280/736 |
| 6,161,866 A | * | 12/2000 | Ryan et al. .................. | 280/736 |

\* cited by examiner

*Primary Examiner*—Brian L. Johnson
*Assistant Examiner*—Deanna Draper
(74) *Attorney, Agent, or Firm*—Tarolli, Sundheim, Covell, Tummino & Szabo L.L.P.

(57) ABSTRACT

A gas bag side impact protection device for vehicle occupants comprises a compressed gas source and an inflatable gas bag. The gas bag has a first chamber inflatable at the side of the thorax of an occupant and a second inflatable chamber. The second chamber is inflatable at the side of the pelvis of the occupant and the chambers are able to be filled by the compressed gas source in such a way that they have different internal pressures in the filled state.

2 Claims, 2 Drawing Sheets

GAS BAG SIDE IMPACT PROTECTION DEVICE

TECHNICAL FIELD

The invention relates to a gas bag side impact protection device for vehicle occupants.

BACKGROUND OF THE INVENTION

Gas bag side impact protection devices are provided to protect a vehicle occupant in the case of a side impact from contact with the lateral structure of a vehicle or with penetrating vehicle parts.

From U.S. Pat. No. 5,803,485, a gas bag side impact protection device is known in which a first chamber to the side of the thorax of an occupant and a second chamber to the side of the head of an occupant is inflated. The two chambers are connected with each other by an equalizing channel, via which gas can arrive during the inflation process from the first into the second chamber.

Gas bag side impact protection devices are likewise known with a gas bag which extends in the inflated state to the side of the thorax and pelvis of the vehicle occupant. In the case of a side impact, the occupant is then cushioned by the gas bag in the thorax/pelvic region.

Different biomechanical characteristics of human body parts, e.g. of the human thorax and of the human pelvis can not be taken into account, or can only be taken into account to a limited extent, with the known devices. Also, a vehicle-specific load distribution with points of concentration in the pelvic or thorax region, for example by a markedly high or low sitting position in the vehicle or special lateral structures, can not be balanced out or can only be balanced out incompletely with the known gas bag side impact protection devices.

BRIEF SUMMARY OF THE INVENTION

A gas bag side impact protection device is to be provided by the invention, by which the risk of injury on side impact can be reduced.

This is achieved in a gas bag side impact protection device which comprises a compressed gas source and an inflatable gas bag. The gas bag has a first chamber inflatable at the side of the thorax of an occupant and a second inflatable chamber. The second chamber is inflatable at the side of the pelvis of the occupant and the chambers are able to be filled by the compressed gas source in such a way that the, have different internal pressures in the filled state. Through the division of the gas bag volume into a chamber associated with the thorax and a chamber associated with the pelvis, the prerequisites are provided for adapting the protection device to the different biomechanical characteristics of the thorax- or pelvic region of a vehicle occupant. By the chambers being filled such that in the filled state they have different internal pressures, for example, the more sensitive thorax region can be cushioned more softly than the pelvis by a lower internal pressure in the thorax chamber compared with the pelvic chamber. Furthermore, the protection device can also be adapted to a vehicle-specific load distribution in a side impact, which distribution can result for example by side walls of the interior in the thorax- and pelvic region, respectively, which are constructed so as to be differently stable in sections and thereby penetrating to a different extent in the case of a side impact. Through this improved adaptation on the one hand to the biomechanical characteristics of the vehicle occupant and on the other hand the mechanical characteristics of the vehicle side structure, the risk of injury on side impact can be reduced compared with conventional gas bag side impact protection devices.

In further development of the invention, provision is made that the pressure in the first chamber lies in the region of 0.5 bar and the pressure in the second chamber lies in the region of 1.5 bar. Through these steps, the gas bag has a higher internal pressure in the pelvic region than in the more sensitive abdominal- and thorax region so that despite optimum protective effect on side impact through the high pressure in the pelvic chamber, the load for the abdominal- and thorax region of the occupant is reduced.

Steps developing the invention further make provision that the compressed gas source comprises a single gas generator and a housing at least partially surrounding the gas generator, and the housing comprises at least a first inflow opening which opens into the first chamber and at least a second inflow opening which opens into the second chamber, the free cross-section of the first and the second inflow openings, respectively, being adapted to the volume of the first and second chambers, respectively, to the compressed gas source and to the internal pressure to be reached at a predetermined moment in the first and second chambers, respectively. Hereby, an improved protective effect can be achieved with only one gas generator compared with conventional systems, so that the increased structural expenditure remains low. The different internal pressures in the chambers are achieved by a corresponding dimensioning of the inflow openings into the first and second chambers, respectively, so that the protection device can be constructed simply and at a favorable cost. The corresponding dimensioning of the inflow openings is sufficient for achieving different internal pressures in the chambers, because different internal pressures in the chambers only have to be achieved at a predetermined moment in the filled state. During the inflation process of the chambers, taking place very quickly, and up to the impact of the vehicle occupant, no equalizing of the internal pressures can occur in the two chambers. The coordinating of the free cross-section of the inflow openings to the compressed gas source takes place in particular with regard to the pressure generated by the compressed gas source. It is sufficient here that the chambers have a different internal pressure at a predetermined moment, for example at the moment at which the impact of a vehicle occupant is expected The protection device thereby does not have to be designed such that the chambers in the static state have different internal pressures; rather, a different internal pressure suffices in the chambers at the predetermined moment during the dynamic processes of gas bag filling and also with the filled gas bag. Owing to this design, by which different internal pressures are merely to be reached at a predetermined moment in the filled state of the chambers, structural steps for ensuring a static pressure holding capability of the chambers can be dispensed with and the structure of the protection device can be provided in a simple manner.

Advantageously, the housing has a prechamber in flow connection With the gas generator and with the first and second inflow openings. The provision of a prechamber facilitates the distribution of the gas stream, delivered from the gas generator, to the first and second inflow openings, respectively, and hence to the first and second chambers, respectively.

In further development of the invention, the gas bag is provided With a dividing seam for the formation of the first and the second chambers. Such a construction makes possible a simple production of the gas bag. Also, a dividing seam between the first chamber, inflatable to the side of the thorax of an occupant, and the second chamber, inflatable to the side of the pelvis of the occupant, reduces the gas bag volume in the abdominal region of the occupant and thereby relieves load from this sensitive region.

It is advantageous that the compressed gas source and the gas bag in the folded state are integrated into the backrest of a vehicle seat. Independently of the position of the backrest, the position of the chambers to the occupant thereby remains substantially identical, and an alteration to the protective effect by adjusting the seat is prevented.

Finally, provision is made that a control unit, and means connected with the control unit are provided for altering the free cross-section of the first and/or second inflow opening. These steps permit an adaptation of the gas bag side impact protection device with regard to the internal pressures which are reached in the chambers, during the operation of a vehicle, to parameters which can influence the protective effect, for example the weight and the size of an occupant, the ambient temperature or the traveling speed. These parameters are detected by means of sensors and are evaluated in the control unit.

Then, according to the result of the evaluation, the control unit alters the free cross-section of the first and/or second inflow opening, for example via electrically activatable sliders or blinds.

DETAILED DESCRIPTION OF A PREFERRED EMBODIMENT

Figure 1:
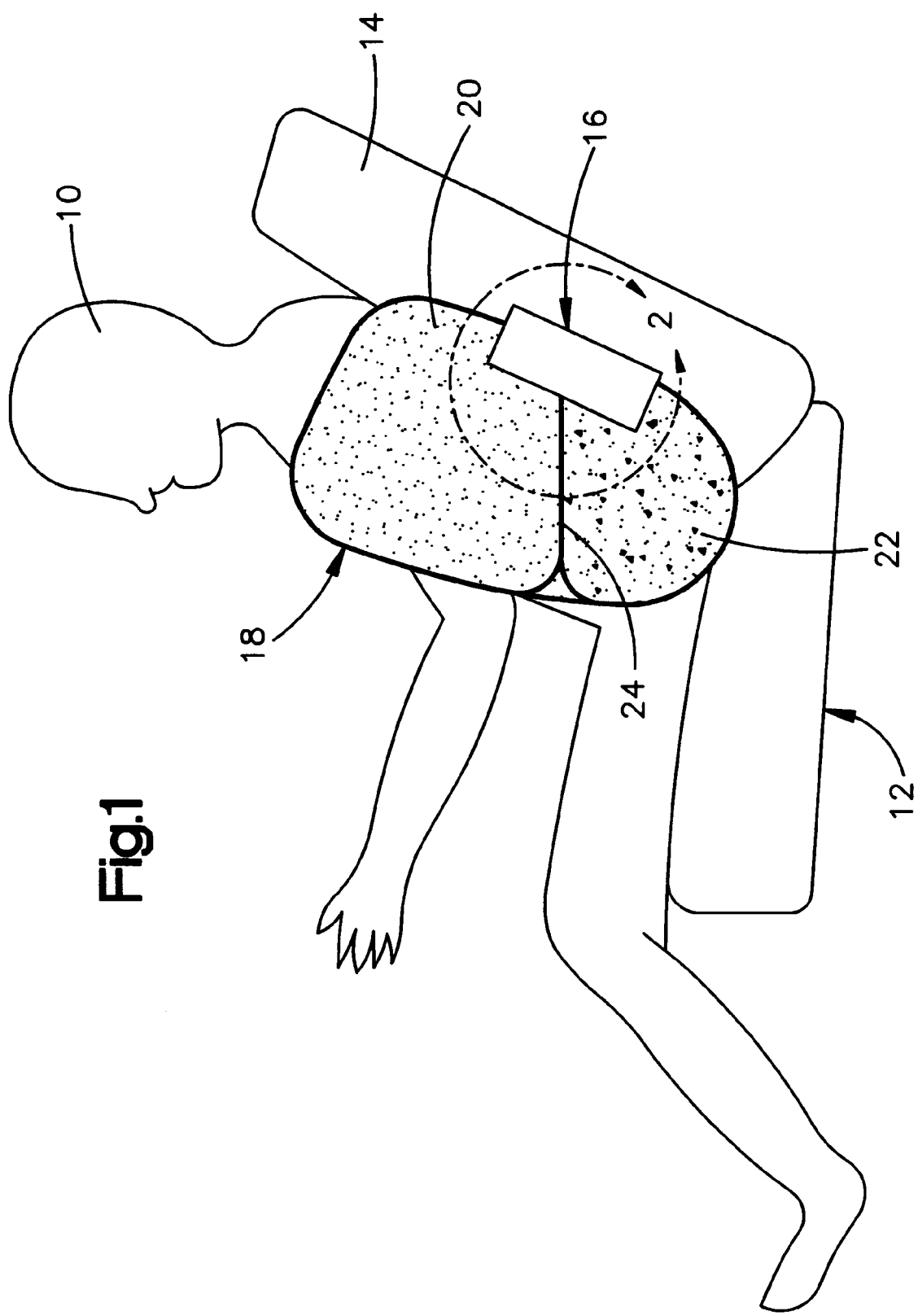
FIG. 1 shows a diagrammatic illustration of the gas bag side impact protection device according to the invention, in activated state.

In FIG. 1 a vehicle occupant 10 is illustrated who is sitting in a vehicle seat 12. The vehicle seat 12 has a backrest 14, into which a gas bag side impact protection device according to the invention is integrated. The gas bag side impact protection device is illustrated in activated state in FIG. 1 and has a compressed gas source 16 and an inflatable gas bag 18. The gas bag 18 in turn has a first chamber 20, which is inflated to the side of the thorax of the occupant 10. A second chamber 22 of the gas bag 18 is inflated to the side of the pelvis of the occupant 10. The two chambers 20, 22 have a different internal pressure, which is indicated in FIG. 1 by a different marking of the inner region of the chambers 20, 22. The chambers 20 and 22 of the gas bag 18 are completely separated from each other here by a dividing seam 24. In order to protect the thorax region of the occupant 10, which is more sensitive compared with the pelvis of the occupant, the internal pressure of the first chamber 20 amounts to approximately 0.5 bar, whereas the internal pressure in the second chamber 22, inflated to the side of the pelvis, lies at 1.5 bar. FIG. 1 represents the gas bag side impact protection device at a moment shortly before the impact of the vehicle occupant 10 onto the gas bag 18 At this moment, the chambers 20, 22 have the previously mentioned different internal pressures, so that the thorax- or pelvic region of the occupant 10 on impact onto the chamber 20, 22 of the gas bag 18 are stressed at different intensities.

Figure 2:
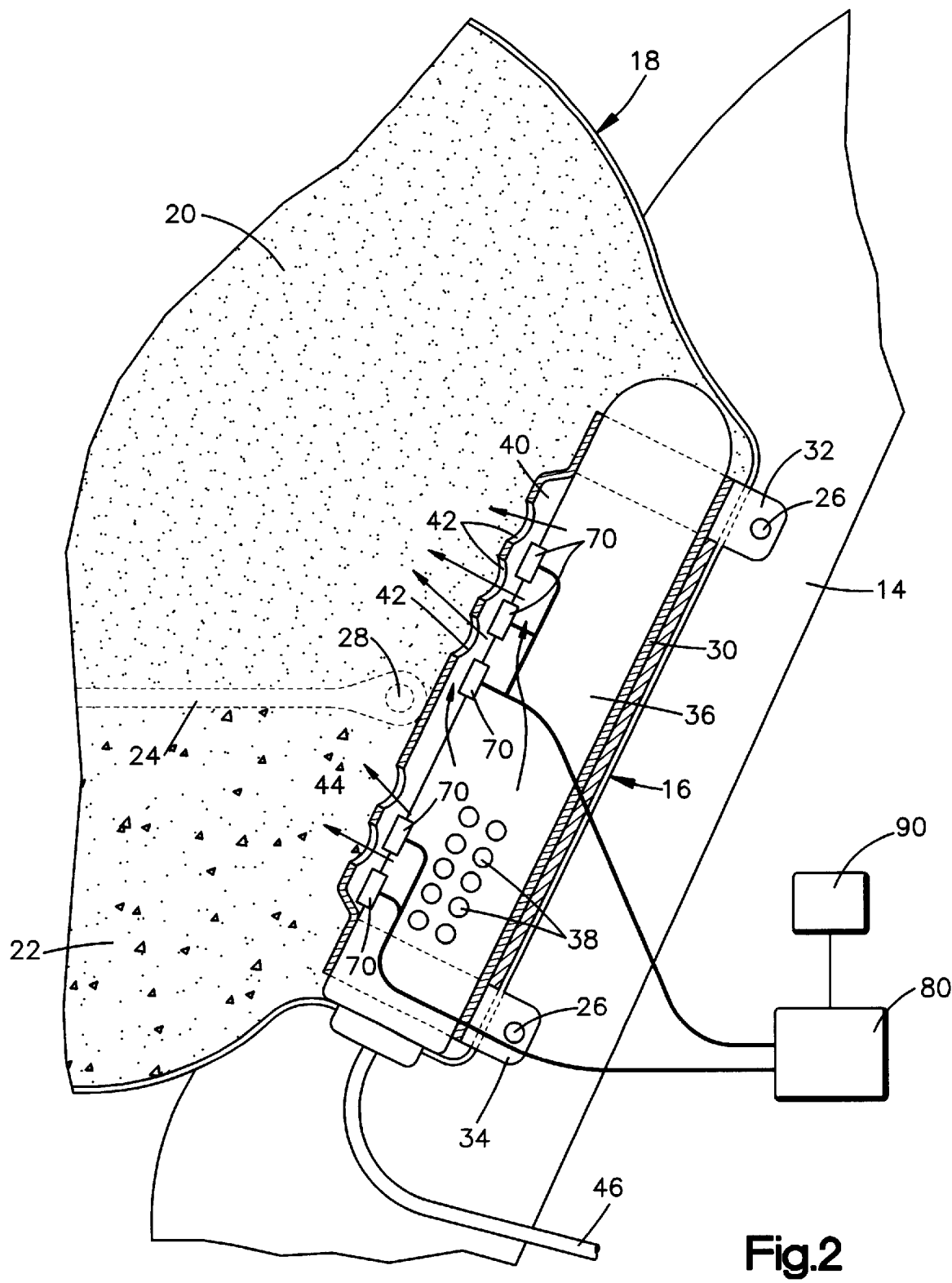
FIG. 2 shows a partial sectional view of the detail II of the gas bag side impact protection device illustrated in FIG. 1

The circle marked by II defines a cutaway portion which is illustrated in more detail in FIG. 2.

In the partial section view of FIG. 2, firstly the backrest 14 can be seen, to which the compressed gas source 16 is attached in a conventional manner at attachment points 26. The compressed gas source 16 is arranged substantially inside the gas bag 18, the attachment points 26, however, lie outside the volume of the gas bag 18. The chamber 20 and the chamber 22 of the gas bag 18 can likewise be seen, which are completely separated from each other by the dividing seam 24. At the end of the dividing seam 24 facing the compressed gas source 16, a reinforcement 28 is arranged, which prevents the tearing out of the dividing seam 24 during the inflation process and during the impact and thereby also ensures the complete separation of the chambers 20 and 22 in the inflated state of the gas bag 18.

The compressed gas source 16 has a tubular housing 30 which is constructed at its upper and lower ends, respectively, in the form of a pipe clip 32 and 34, respectively. The pipe clips 32 and 34 extend through the wall of the gas bag 18 to the respective attachment point 26 on the backrest 14. The tubular housing 30 surrounds a cylindrical gas generator 36 in the central section thereof which is secured in the housing by the pipe clips 32 and 34. The gas generator 36 is also sealed in the housing 30 with respect to the environment by the pipe clips 32 and 34. The gas generator 36 has on its central section, lying in the housing 30, outflow openings 38, via which gas delivered from it after its activation can flow into the housing 30.

The housing 30 here forms between its inner wall and the outer wall of the central section of the gas generator 36, which extends between the pipe clips 32 and 34, a prechamber 40 via which gas, flowing out from the outflow openings 38 of the gas generator 36, can arrive at first inflow openings 42 and second inflow openings 44 in the wall of the housing 30. The first inflow openings 42 open into the first chamber 20 of the gas bag 18, and the second inflow openings 44 open into the second chamber 22 of the gas bag 18. Whereas the inflow opening 42 consists of three individual circular passages through the outer wall of the housing 30, the inflow openings 44 is formed by only two circular passages. The free cross-section of the first inflow openings 42 and the second inflow opening 44, respectively, available for a flow, thereby results from the sum of the free individual cross-sections of the circular passages. The free cross-section of the first inflow opening 42 is coordinated here to the volume of the first chamber 20, the pressure generated by the gas generator 36 and the moment at which an internal pressure of 0.5 bar is to be reached in the first chamber 20. In the described embodiment, the predetermined moment lies shortly before the impact of the vehicle occupant onto the gas bag 18. In an analogous manner, the free cross-section of the second inflow opening 44 is coordinated with the volume of the second chamber 22, the pressure generated by the gas generator 36 and the internal pressure of 1.5 bar to be reached before the impact of the occupant.

The activation of the gas generator 36 takes place via the leads 46, which are connected with a conventional device, not illustrated, for impact detection.

After activation of the gas generator 36, gas generated therefrom flows out from the outflow openings 38 into the prechamber 40 and through the inflow openings 42 and 44, respectively, into the chambers 20 and 22, respectively. Consequently an excess pressure occurs in the prechamber 40, and the quantity of gas flowing out into the chambers 20, 22 is substantially determined by the pressure in the prechamber 40 and the free cross-section of the respectively associated inflow openings 42, 44. In order to achieve a higher internal pressure in the chamber 22 than in the chamber 20, the free cross-section of the inflow opening 44 is therefore greater than the free cross-section which would be necessary in order to fill the chamber 22 equally quickly and with the same internal pressure as the chamber 20. Consequently, the chamber 22 is filled more quickly than the chamber 20, and the internal pressure of the chamber 22 rises more quickly than the pressure in the chamber 20. It is therefore possible to reach different internal pressures in the chambers 20 and 22 at a moment shortly before the impact of a vehicle occupant onto the gas bag 18. Any pressure equalization processes between the chambers 20 and 22 via the inflow openings 42 and 44 and the prechamber 40 do not occur until later here and can not affect or can only affect negligibly the reaching of different internal pressures in the chambers shortly before the impact of a vehicle occupant.

Finally, provision is made that a control unit 80, and means 70 connected with the control unit, are provided for altering the free cross-section of the first and/or second inflow openings 42, 44. These steps permit an adaptation of the gas bag side impact protection device with regard to the internal pressures which are reached in the chambers 20, 22, during the operation of the vehicle, and to parameters which can influence the protective effective. For example, such parameters may be the weight and the size of an occupant 10, the ambient temperature, and/or the traveling speed of the vehicle. These parameters are detected by means of sensors 90 and are evaluated in the control unit 80. Then, according to the result of the evaluation, the control unit 80 alters the free cross-section of the first and/or second openings 42, 44 via the altering means 70. The altering means 70 may be electrically activated sliders or blinds.

What is claimed is:

1. A gas bag side impact protection device for vehicle occupants, comprising a compressed gas source and an inflatable gas bag, said gas bag having a first chamber inflatable at a side of the thorax of an occupant and a second inflatable chamber, wherein said second chamber is inflatable at a side of the pelvis of said occupant and said chambers are able to be filled by said compressed gas source in such a way that they have different internal pressures in a filled state, said pressure in said first chamber lying in the region of 0.5 bar and said pressure in said second chamber lying in the region of 1.5 bar, said compressed gas source comprising a single gas generator and a housing at least partially surrounding said gas generator, and wherein said housing comprising at least a first inflow opening which opens into said first chamber and at least a second inflow opening which opens into said second chamber, a free cross-section of said first and second inflow openings, respectively, being adapted to the volume of said first and second chambers, respectively, to said compressed gas source and to said internal pressure to be reached at a predetermined moment in said first and second chambers, respectively, said housing having a prechamber in flow connection with said gas generator and said first and second inflow openings.

2. A gas bag side impact protection device for vehicle occupants, comprising a compressed gas source and an inflatable gas bag, said gas bag having a first chamber inflatable at a side of the thorax of an occupant and a second inflatable chamber, wherein said second chamber is inflatable at a side of the pelvis of said occupant and said chambers are able to be filled by said compressed gas source in such a way that they have different internal pressures in a filled state, said compressed gas source comprising a first inflow opening which opens into said first chamber and a second inflow opening which opens into said second chamber, said protection device also including a control unit and means connected with said control unit for altering a free cross-section of at least one of said first and second inflow openings.

* * * * *